L. W. COLVER.
Corn-Planter.
No. 12,895. Patented May 22, 1855.
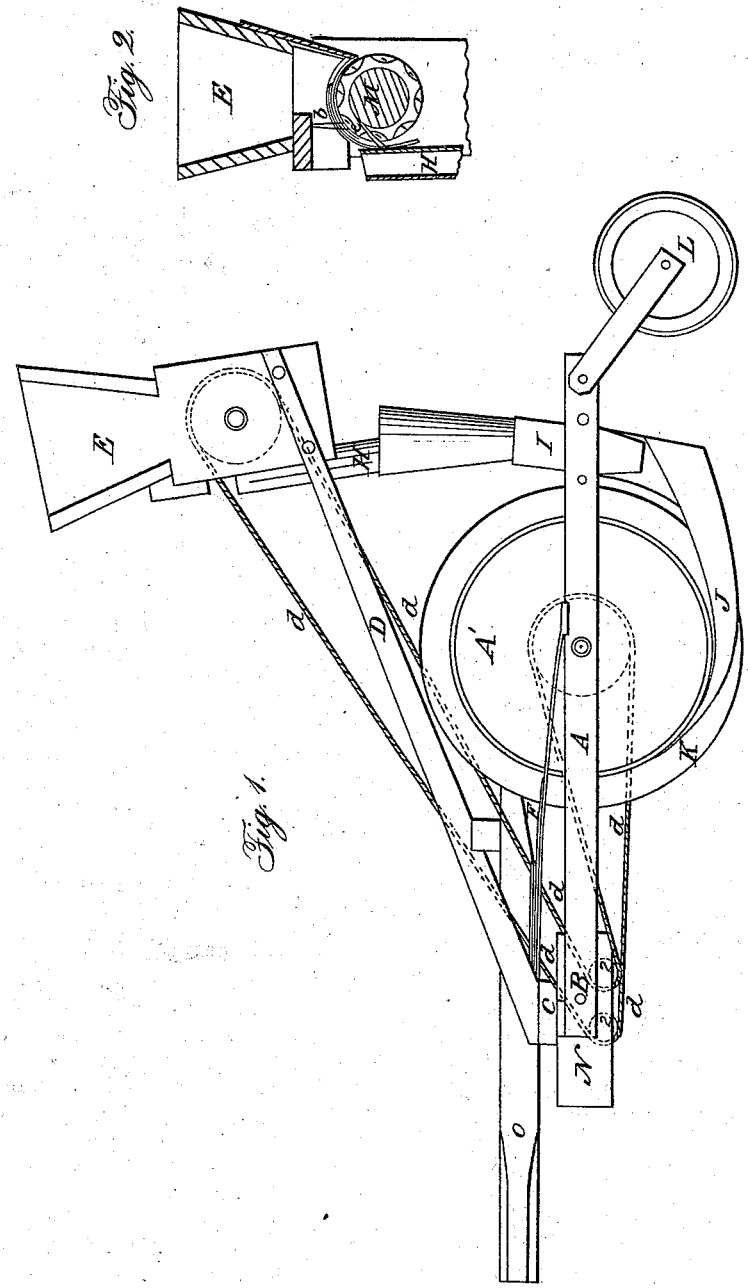

UNITED STATES PATENT OFFICE.

LEWIS W. COLVER, OF LOUISVILLE, KENTUCKY.

IMPROVEMENT IN SEED-PLANTERS.

Specification forming part of Letters Patent No. 12,895, dated May 22, 1855.

*To all whom it may concern:*

Be it known that I, LEWIS W. COLVER, of Louisville, in the county of Jefferson and State of Kentucky, have invented certain new and useful Improvements in Seed-Planters; and I do hereby declare the following to be a full, clear, and exact description of the same, reference being had to the accompanying drawings, making a part thereof, in which—

Figure 1 represents a side view of the seed-planter. Fig. 2 represents a vertical section through the hopper, seeding cylinder, and part of the tube.

Similar letters in both figures denote like parts.

The nature of my invention relates, first, to the manner of hinging the supporting-pieces and interposing springs between them, so that said pieces may work from the same centers and the springs tend to hold the wheels to the ground in such manner that any of the series may yield to any inequalities in the ground without affecting the others; also, in the arrangement of the sword or divider upon the tube, and projecting forward in close contact with the flange on the wheel, so that it may enter the ground with the flange and spread and hold open the furrow for the reception of the grain.

To enable others skilled in the art to make and use my invention, I will proceed to describe the same with reference to the drawings.

A represents a side piece, in which the axle $a$ of the wheel A' is supported. The side piece, A, is pivoted or hinged at B to the front cross-piece, C. I have represented in the drawings but one of the side pieces A and but one wheel; there may be, however, any suitable number of each—one for each furrow that the machine is designed to sow or plant.

To the front cross-piece, C, are connected the arms D, upon the extreme rear portions of which are arranged the seed hopper or box E.

A spring, F, is interposed between the pieces A D, so that the weight of the hopper and the machine generally shall hold the wheels into the ground, while each wheel of the series may rise to any obstruction or follow any depression in the ground against or by the action of said spring without raising or carrying down with it any other of the series of similar wheels with which the machine is to be provided.

H is a tube or conveyer, into which the seed is forced by a small arm, $c$, Fig. 2, which runs in a groove cut below the bottoms of the cells in the seeding-cylinder, to insure the delivery of the grains from said cells should it become packed therein. This tube H may be made of leather or any other flexible material, and passes into a metallic tube, I, on the bottom of which tube I is arranged a peculiarly-shaped sword or divider, J, extending forward of and in close contact with the flange K, which is forced into the ground by the weight of the machine. The front part of this sword is curved or turned upward, and terminates in a point. Its office is to enter the ground with the flange, and as it gradually widens toward its rear, and acts as a shoe at that point, it spreads and holds open the furrow thus cut by the flange K, into which the seeds drop through the tube I, said seed, after it is thus dropped in the furrow, being covered up by the covering-wheel L, which follows in the line of each furrow and forces or pushes the ground over them.

M is a seeding-cylinder arranged in the bottom of the hopper and furnished with cells 1 1 1, &c., into which the seeds drop, and by which they are carried out and dropped with the aid of the small arm $c$, there being also a brush, $b$, to push back what seeds may project out of the cells.

At each end of the seeding-cylinder there is a pulley or groove, (as seen in dotted lines in Fig. 1, one only being represented in the drawings,) around which, and around two small pulleys, 2 2, one on each side of the pivoting-line B, and around a pulley (in dotted lines) on the axles $a$, passes an endless belt, $d$. By means of this endless belt motion is communicated to said seeding-cylinder, and, although the axle $a$ and its wheel and the piece A may approach the hopper E, or vice versa, yet the belt will always remain tight, as these two pieces must approach each other in the arc of a circle whose center is at B, which center is also intermediate between the small pulleys 2 2, and the whole consequently move upon the same or practically the same centers, and always remain at the same distance from said center.

The small pulleys 2 2 are hung in a sliding frame, N, which is made adjustable in the front cross-piece, C, so that by shifting said sliding frame the belt $d$ may be tightened, should it become loose. Two of these belts will be found sufficient, but more may be used.

O is the tongue by which the machine is drawn, the driver being mounted on the box E to aid by his weight in holding the machine into the ground.

Having thus fully described the nature of my invention, what I claim therein as new, and desire to secure by Letters Patent, is—

1. Hinging the pieces A, which support the wheels A', at the point B, this being also the point of attachment of the arm D, and interposing between A and D a spring, F, so that said two pieces may radiate from nearly the same centers, said springs tending to hold the wheels into the ground, while each one of the series may yield to any inequalities in the ground without affecting the others, as set forth.

2. The arrangement of the sword or divider, such as described, upon the tube I and projecting it forward in close contact with the flange on the wheel so that it may enter the ground with said flange and spread and hold open the furrow for the reception of the seed, as described.

L. W. COLVER.

Witnesses:
A. B. STOUGHTON,
T. C. DONN.